United States Patent

Shibuya et al.

[11] Patent Number: 5,867,607
[45] Date of Patent: Feb. 2, 1999

[54] DIGITAL HALFTONING APPARATUS AND METHOD

[75] Inventors: Takeshi Shibuya, Ibaraki-ken; Tatsunari Satou; Taisaku Seino, both of Tsuchiura, all of Japan

[73] Assignee: Hitachi, Ltd., Tokyo, Japan

[21] Appl. No.: 617,032

[22] Filed: Mar. 18, 1996

[30] Foreign Application Priority Data

Mar. 20, 1995 [JP] Japan ................................. 7-060374

[51] Int. Cl.$^6$ ............................. G06K 9/38; H04N 1/40
[52] U.S. Cl. ..................... 382/270; 382/254; 358/456; 358/457; 358/459; 358/465
[58] Field of Search ................................. 382/270, 254; 358/448, 455, 456, 457, 458, 459, 465, 466

[56] References Cited

U.S. PATENT DOCUMENTS

| | | | |
|---|---|---|---|
| 5,315,669 | 5/1994 | Kumagai | 382/270 |
| 5,438,634 | 8/1995 | Kumagai | 382/270 |
| 5,526,445 | 6/1996 | Smutek et al. | 382/270 |

*Primary Examiner*—Thomas D. Lee
*Attorney, Agent, or Firm*—Antonelli, Terry, Stout, & Kraus, LLP

[57] ABSTRACT

A raster device such as a digital printer or the like which sequentially compares input image data with each element in a threshold matrix to convert the input image data into binary or multi-level pixel data. For providing both a higher resolution and a larger number of halftone levels for an output image at a low cost, an input image is decomposed into four color planes as CMYK data, and data on each color plane is compared with a dither matrix in a binarization circuit to be converted to binary data. The dither matrix generates a dither pattern composed of eight clusters having substantially the same shape as a kernel cluster capable of expressing 15 or more halftone levels. In this way, a smooth gradation having 120 or more halftone levels is realized by repetitively applying a small pattern having approximately 15 halftone levels.

5 Claims, 8 Drawing Sheets

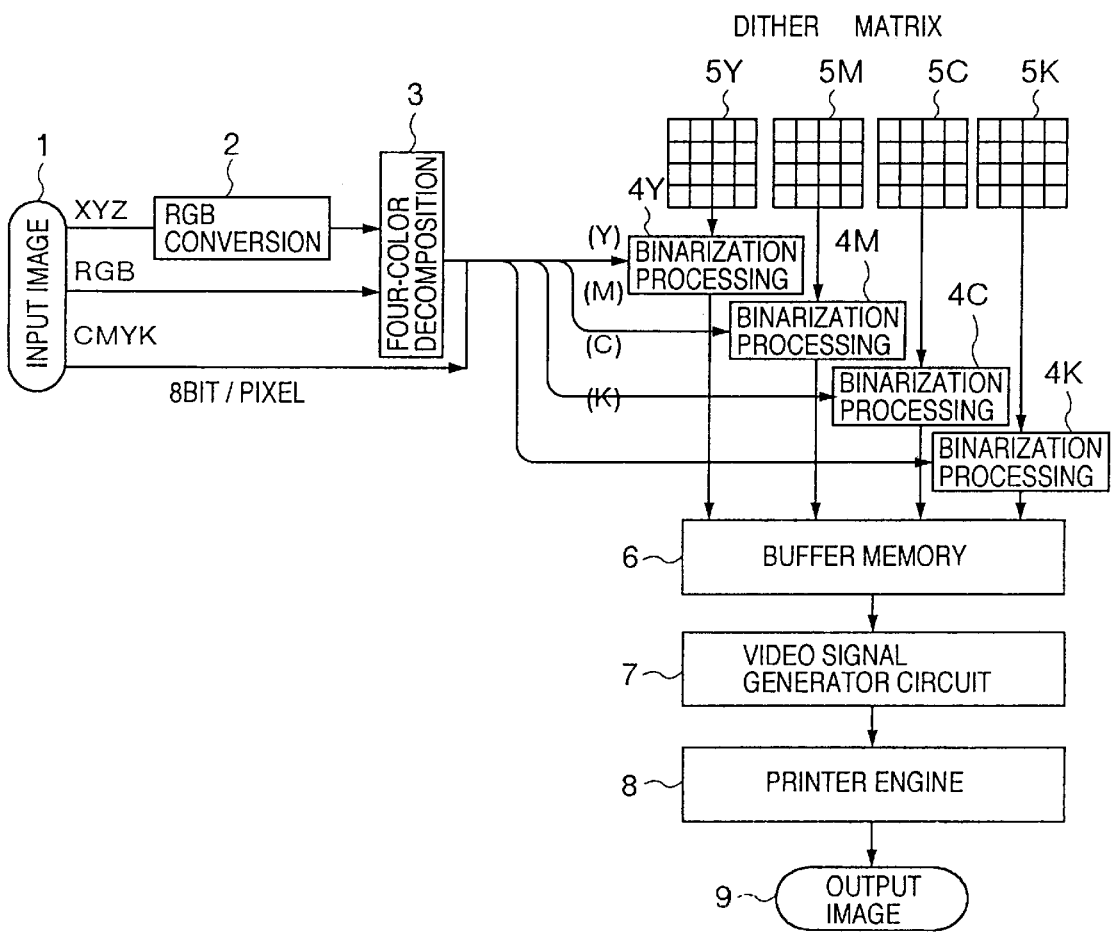

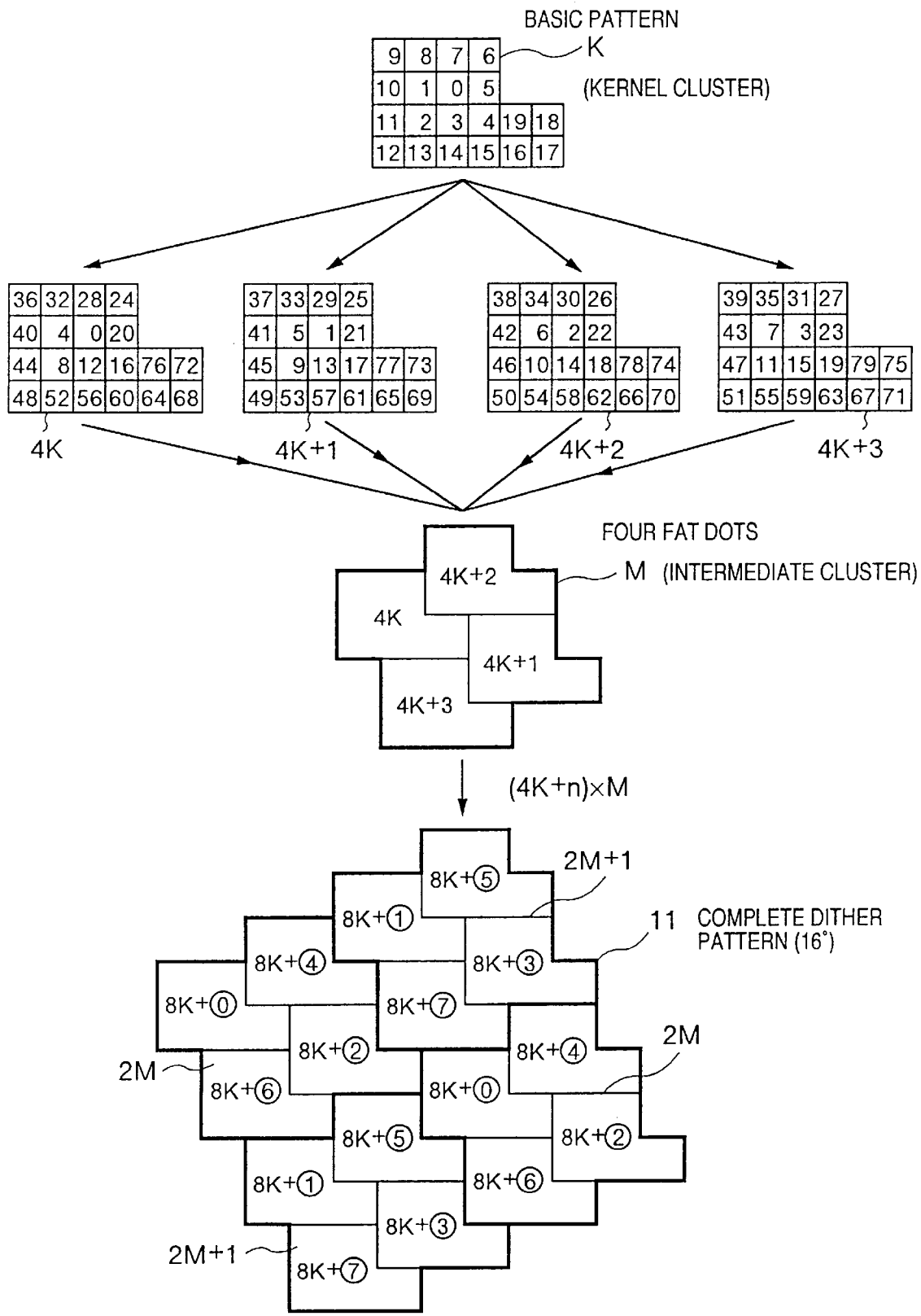

FIG.6A
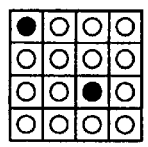
FIG.6B
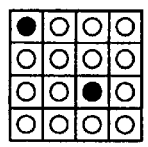
FIG.6C
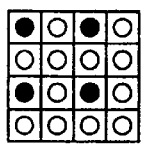
FIG.6D
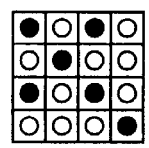
FIG.6E
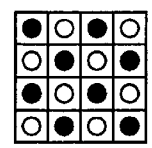
FIG.6F
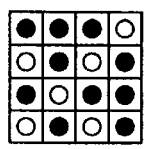
FIG.6G
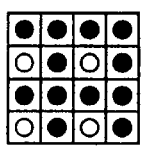
FIG.6H
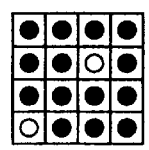
FIG.6I
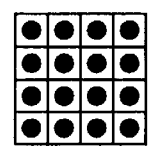
● : ON DOT
○ : OFF DOT
FIG.7A
FIG.7B
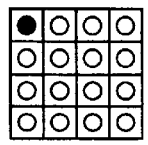
FIG.7C
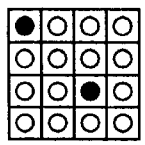
FIG.7D
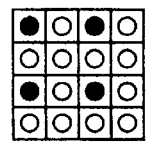
FIG.7E
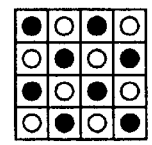
FIG.7F
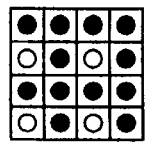
FIG.7G
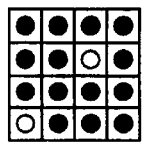
FIG.7H
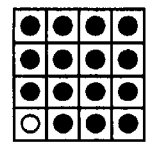
FIG.7I
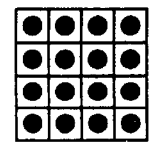
● : ON DOT
○ : OFF DOT

FIG.8
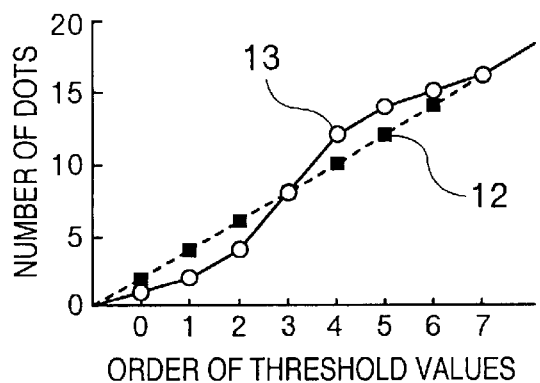
FIG.9A          FIG.9B
FIG.10A          FIG.10B
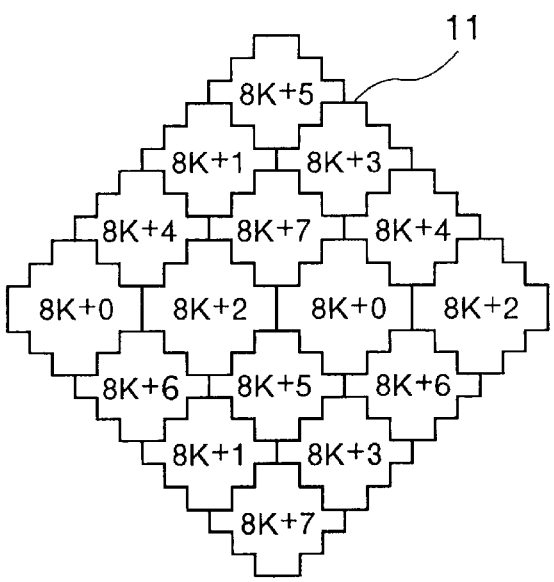

| | | | K | | |
|---|---|---|---|---|---|
| 9 | 8 | 7 | 6 | 5 | 4 |
| 11 | 10 | 0 | 1 | 2 | 3 |
| 12 | 13 | 14 | 15 | 16 | 17 | 18 | 19 |

| | | | K | | |
|---|---|---|---|---|---|
| 9 | 8 | 7 | 6 | 5 | 4 |
| 11 | 10 | 0 | 1 | 2 | 3 |
| 12 | 13 | 14 | 15 | 16 | 17 | 18 | 19 |

| | | 9 | 8 | 7 | 6 | 5 | 4 | | K |
|---|---|---|---|---|---|---|---|---|---|
| 21 | 19 | 11 | 10 | 0 | 1 | 2 | 3 | 18 | 20 |
| | | 12 | 13 | 14 | 15 | 16 | 17 | | |

DIGITAL HALFTONING APPARATUS AND METHOD

BACKGROUND OF THE INVENTION

The present invention relates generally to an image output device referred to as a raster device which represents images provided by a printer, facsimile, CRT and like, as a set of dots or pixels, and more particularly to digital halftoning techniques for realizing image representations in a higher resolution and with a larger number of halftone levels of gradation.

Conventionally, raster devices having a small number of halftone levels expressible by one pixel, such as a digital printer, have utilized for many cases halftone representation measures known as a dither method, an error diffusion method, or the like to simulatively compensate for halftones.

Within these conventional methods, the dither method is widely utilized since it is easily implemented and provides a relatively uniform image quality although it is inferior to the error diffusion method in terms of the gradation and resolution.

The dither method sequentially compares each point in an input image matrix with each element in a threshold matrix referred to as a dither matrix to determine an actual output halftone level of a corresponding pixel. Particularly, a device, which provides an output image at two levels of gradation, determines whether a pixel corresponding to a point is on or off.

As an example of such a dither matrix, an article "An Optimum Method For Two-level Rendition Of Continuous-halftone Pictures" by B. E. Bayer (ICC Conf. Rec. 26-11~15), 1973 discloses patterns shown in FIGS. 1A and 1B. The dither pattern shown in FIG. 1A is a distribution type dither pattern commonly known as a Bayer-type pattern. The pattern shown in FIG. 1B is employed by a dot concentration type dither method which utilizes a plurality of dots to simulate fat dots, the diameter of which is increased corresponding to a halftone level.

The application of the dither pattern shown in FIG. 1A will result in an output image, though its resolution is high, having a pattern giving a peculiar coarse feeling which is highly prominent. On the other hand, in an output image generated by the application of the dither pattern shown in FIG. 1B, an eyesore characteristic pattern will not be produced in the output image since fat dots having diameters corresponding to halftones are orderly arranged at regular intervals. However, since the resolution of the output image is determined by the intervals of the fat dots, the interval of the fat dots becomes wider if a larger number of halftone levels are provided for images, and a sufficient number of halftone levels cannot be ensured for images if the fat dots are to be arranged at narrower intervals.

To cope with the problems mentioned above, there has conventionally been proposed a method for arranging a plurality of fat dots in a sequence of threshold values in a dither matrix. For generating such a dither matrix, methods for applying a Bayer pattern generation algorithm shown in FIG. 1A to a dot concentration type dither have been often utilized, as described in a report entitled "Threshold Arranging Method in Dot Concentration Type Dither Method" by Ueno et al. in 1980 General National Meeting of Japanese Institute of Electronics, Information and Communication Engineers.

Specifically, the above-mentioned Bayer's extension algorithm generates n patterns of the same form nD+0, nD+1, . . . , nD+(n−1) (generally, n=2 or 4) from a basic dot concentration type dither pattern D, and combines the thus generated patterns to extend the dither pattern.

Actually, dither patterns disclosed as FIGS. 16 and 17 in JP-A-61-125264, and many dither patterns shown in Japanese article by Kawamura et al. "Halftone Reproducing Method for Digital Color Printing in Electronic Photography (III)", in Transactions of The Institute of Image Electronics Engineers of Japan, Vol 25, No. 1 (1986) are generated by methods as mentioned above. In addition, JP-A-58-173973 discloses a rather irregular method.

A fat dot density of the dot concentration type dither pattern is measured in lines per inch (lpi). When a human observes an output image at a distance of approximately 30 cm, the fat dot density in a range from 100 lpi to 120 lpi exceeds the resolution of human so that an image having this range of fat dot density is recognized as a smooth image. Stated another way, a sudden qualitative change occurs in an output image with the fat dot density ranging between 100 lpi and 120 lpi.

Correspondingly, since discontinuous halftones are more likely to be prominent in a smooth image corresponding to the fat dot density of approximately 120 lpi, the application of a dither pattern having a less number of halftone levels will result in a rather unnatural image. A number of halftone levels required in this case is also considered based on approximately 120.

Therefore, if a density of fat dots equal to 120 lpi is to be ensured in a binary raster device having a resolution of 600 dpi (dot per inch) such as a high definition laser beam printer or the like, which is commonly available at present, a fat dot is composed of 5 by 5 pixels (25 halftone levels) or less, so that a dither pattern must be composed of five or more fat dots.

Conversely, however, as the number of fat dots simulated in a dither pattern is increased, an irregular and coarse dot arrangement may be generated in a lower halftone level representation, that is, an area of highlight, where the centers of all dots are not aligned, thus, damaging the quality of a resulting output image, as described in JP-A-58-173973.

As is understood from the above, the smoothness of images is more or less sacrificed in the prior art. Specifically, the number of fat dots in a dither pattern is limited to two–four, as disclosed in the Kawamura's article and JP-A-61-1255264. Alternatively, a plurality of dither matrices are prepared such that a different matrix is used for inputted pixels in a lower halftone area, as disclosed in JP-A-58-173973.

The method described in JP-A-58-173973, however, has a problem that complicated memories, associated circuits and programs must be configured for preparing a plurality of dither matrices, thus causing a lower processing speed and an increased cost. Particularly, it has been found that the continuity of halftone or gradation is degraded.

The method described in JP-A-61-125264 also has a problem that the number of fat dots set to four may cause a prominent degradation in image quality due to irregular dots in a lower halftone area, and that the number of fat dots set to two may result in a largely damaged gradation. Conversely, if a number of halftone levels equal to or more than 120 is to be ensured using two fat dots, an 8×8 image is required for one fat dot, so that a coarse image having a density of fat dots equal to 75 lpi will be generated.

In view of an improvement in the resolution of an output device, assuming that a number of halftone levels equal to or more than 120 is to be realized with four fat dots, as disclosed in JP-A-61-1255264, even if a fat dot is composed of 6×6 pixels, the output device is required to have a resolution of 720 dpi (120×6=120) in order to produce images having a screen line number of 120 lpi. With a device, for example, a page printer, which temporarily stores a complete output image in a buffer, an increase in memory buffer capacity of as much as 20% will give rise to a seriously increased cost.

SUMMARY OF THE INVENTION

It is an object of the present invention to provides a digital gradation apparatus and a digital halftoning method, for use with a raster device having a resolution presenting difficulties in satisfying both the smoothness of output image and the gradation, which apply a single dither pattern to consistently process the fat dot density and the gradation to realize the reproduction of smooth images at a low cost.

To achieve the above object, according to one aspect of the present invention, the above-mentioned Bayer type extension algorithm is applied twice to a dot concentration type basic dither pattern capable of expressing 15 or more halftone levels with an interval between generated fat dots (fat dot density) not exceeding 0.25 mm, and more preferably not exceeding 0.21 mm. Simultaneously, a threshold value for an initial point of each fat dot which appears in highlight halftone levels is rearranged.

Specifically, the digital halftoning method may be implemented in the following manner.

(1) In a digital halftoning method for a raster device which sequentially compares each pixel in an input image with each element in a threshold matrix to output a rectangular matrix of binary or multilevel pixels, the threshold matrix is composed of two intermediate threshold matrices generated by threshold patterns 2M, 2M+1 based on a basic intermediate threshold matrix M, and the basic intermediate threshold matrix M in turn is composed of four small threshold matrices generated by threshold patterns 4K, 4K+1, 4K+2, 4K+3 based on a basic small threshold matrix K.

(2) In the digital halftoning method of (1), minimum or maximal threshold values in small threshold matrices constituting the threshold matrix may be relocated independently of the configuration of the threshold matrix.

Also, the digital halftoning apparatus may be implemented in the following manner.

(3) In a digital halftoning apparatus for a raster device which compares each pixel in an input image with each element in a dither threshold matrix to output a binary or multi-level pixel rectangular matrix, wherein a positive square root Do of a product of a resolution of one side of the output rectangular matrix, a resolution of the other side of the matrix, and a value calculated by subtracting one from a number of halftone levels per pixel does not exceed 600 dpi, the threshold matrix includes equal to or more than 120×(120/Do)×(120/Do) fat dots each having its diameter increased in accordance with a halftone level spuriously represented by using a plurality of dots.

(4) In a digital halftoning apparatus for raster device which sequentially compares each pixel in an input image with each element in a threshold matrix to output a binary or multi-level pixel rectangular matrix, the threshold matrix simulates using eight fat dots, the diameter of which increases in accordance with a halftone level spuriously represented by using a plurality of dots.

(5) In a digital halftoning apparatus for a raster device which sequentially compares each pixel in an input image with each element in a threshold matrix to output a binary or multi-dot rectangular matrix, wherein a positive square root Do of a product of a resolution of one side of the output rectangular matrix, a resolution of the other side of the matrix, and a value calculated by subtracting one from a number of halftone levels per pixel does not exceed 600 dpi, the threshold matrix simulates fat dots, arranged at distance pitch not exceeding 0.21 mm, the diameter of which increases in accordance with a halftone level spuriously represented by using a plurality of dots.

By providing the digital halftoning apparatus and the digital halftoning method using the threshold matrix configurations as mentioned above, eight or more fat dots presenting good symmetry are generated, thereby making it possible to realize smooth output images having a number of halftone levels equal to or more than 120 and a screen line number equal to or more than 100 lpi (120 lpi if the interval between fat dots is 0.21 mm) with less disturbed dots in a lower halftone area at a low cost, without modifying the specifications of an output device.

Other object, features and advantages of the present invention will become apparent from the following detailed description taken in conjunction with the accompanying drawings.

BRIEF DESCRIPTION OF THE DRAWINGS

FIGS. 1A and 1B are pattern diagrams showing conventional distribution type and concentration type dither patterns, respectively;

FIG. 2 is an explanatory diagram representing a flow of image processing in a color laser printer to which the present invention is applied;

FIG. 5 is an explanatory diagram for a dither pattern extending method according to one embodiment of the present invention;

FIGS. 6A–6I are pattern diagrams for explaining a comparison of patterns in accordance with an initial order of threshold values 0–7 in which 0–7 indicate initial values for the threshold values 0–7 in FIG. 3, respectively;

FIGS. 7A–7I are pattern diagrams for explaining a comparison of patterns in accordance with an initial order of threshold values 0–7 in which the initial points in FIGS. 6A–6I are rearranged using the scheme of FIG. 5;

FIG. 8 is a graph representing the results of comparing the gradation resulting from the patterns shown in FIGS. 6B–6I with the gradation resulting from the patterns shown in FIGS. 7B–7I;

FIGS. 9A and 9B are pattern diagrams showing a kernel cluster with a screen angle at 0° according to the present invention and an example of a complete pattern generated by the kernel cluster;

FIGS. 10A and 10B are pattern diagrams showing a kernel cluster with a screen angle at 45° according to the present invention and an example of a complete pattern generated by the kernel cluster;

DESCRIPTION OF THE PREFERRED EMBODIMENTS

Figure 3:
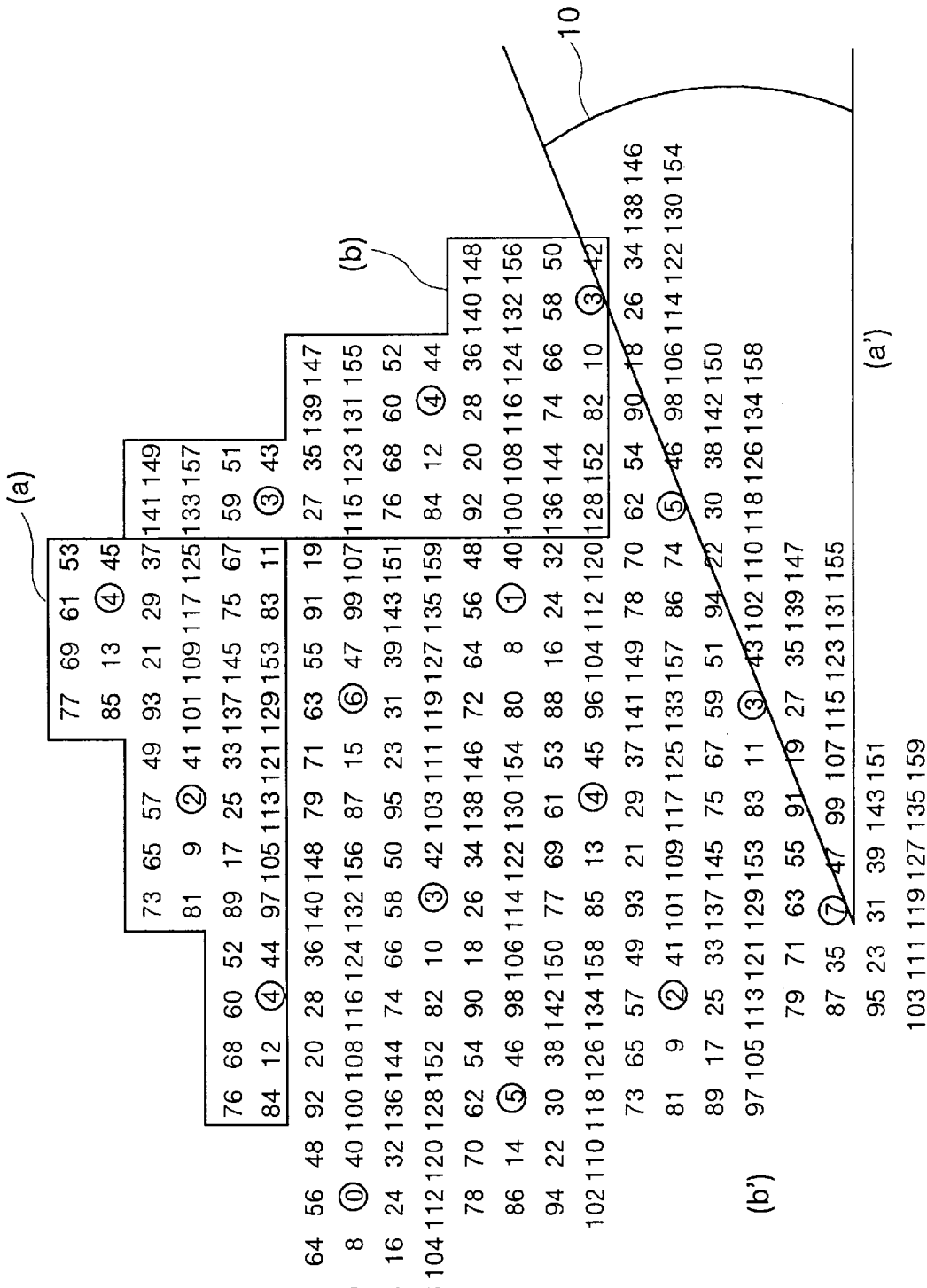
FIG. 3 is a pattern diagram showing an example of a dither pattern according to one embodiment of the present invention.

Embodiments of the present invention will hereinafter be described with reference to the accompanying drawings. It is first noted that in the following, RGB is used to mean Red, Green, and Blue, respectively, and CMYK is used to mean Cyan, Magenta, Yellow, and Black, respectively, as labels of colors.

FIG. 2 is a conceptual diagram representing image processing performed in a binary color laser beam printer to which the present invention is applied. An input image 1 received by an input unit 1A comprises data defining (8 bits)×(a number of pixels)×(a number of planes) in conformity to RGB, CMYK, XYZ defined by Commission Internationale de l'Eclairage (CIE), or the like. The number of planes is three for RGB and XYZ, and four for CMYK. Data on each plane is arranged in a rectangular matrix corresponding to an image to be printed. It will be of course understood that the data are processed as a one-dimensional sequence for scanning the plane as an internal expression of the printer. RGB data are transformed to four-color decomposition processing 3 by a color decomposition unit 3A to be converted to four-plane CMYK format data. XYZ data is passed through an RGB conversion unit 2A for RGB conversion processing 2 before the four-color decomposition processing 3.

8-bit data for each pixel in each of the CMYK planes are further converted to 1-bit binary data for each pixel by an associated binarization circuit 4Y, 4M, 4C, 4K, using a different dither matrix 5Y, 5M, 5C, 5K for each plane. The 1-bit binary data thus converted are stored in a buffer memory 6. A video signal generator circuit 7 modulates the contents of the buffer memory 6 to signal pulses for controlling laser beams, and supplies the signal pulses to a printer engine 8 for generating an output image 9 of the printer.

FIG. 3 shows an example of a dither pattern according to the present invention which is applied to a binary color laser beam printer having a resolution of 600 dpi. It should be noted that the order of threshold values only is shown in FIG. 3 for simplicity. Assigned as actual threshold values are integer values T(n) in a range from 0 to 255 which serve as a monotone function for the threshold value order n (n: integer). In FIG. 3, the centers of fat dots to be simulated are surrounded by circles for the purpose of indication. Particularly, in the shown matrix of the fat dots, an inclination (for example, 24.6°) referred to as a screen angle 10 is set. Advantages obtained by the screen angle have been traditionally known in the printing industry and are also described in detail in the foregoing JP-A-61-125264.

The entire dither pattern may be made equivalent to certain rectangular dither matrices. For example, the dither pattern shown in FIG. 3 is equivalent to a pattern shown in FIG. 4A composed of five 8×8 matrices P1, P2, ..., P5 by parallelly moving a portion (a) to (a') and a portion (b) to (b'). This is also equivalent to a dither matrix shown in FIG. 4B. For the actual binarization processing, the dither matrix of FIG. 4B is utilized.

Specifically explaining, assuming that the size of a dither matrix to be compared has a size of M×N (M, N: integers), a residue resulting from a division of an integer i by M is i'; and a residue resulting from a division of an integer j by N is j', an (i, j) element (8-bit value) of an input image supplied as a rectangular matrix is compared with a threshold value T(n(i', j')) corresponding to a threshold value order n(i', j') of an (i', j') element of the dither matrix. The (i, j) element is converted to a 1-bit value (binary) representing "1" if the (i, j) element is equal to or more than T(n(i', j')), and otherwise to a 1-bit value representing "0".

Figures 4A, 4B:
FIGS. 4A and 4B are pattern diagrams for explaining a concept of generating a dither matrix equivalent to that shown in FIG. 3.

Of course, equivalent processing may be easily realized by repetitively utilizing data on the dither pattern composed only of the portions P1–P5 shown in FIG. 4A. In this event, the portions P1–P5 are shifted each time they are utilized. In the following description, a representation of a dither pattern using the threshold value order as shown in FIG. 3 is used for simplicity.

A pattern serving as a base for generating a dither pattern is hereinafter referred to as a kernel cluster. FIG. 5 illustrates a method of generating the dither pattern shown FIG. 3. Based on a kernel cluster K serving as a concentration type basic pattern, each element in the cluster K is multiplied by four, a constant (0–3) is added thereto to generate each pattern in accordance with a threshold value order labelled by 4K, 4K+1, 4K+2, 4K+3, and these patterns are combined to generate an intermediate cluster M of four fat dots.

Similarly, based on the intermediate cluster M, each element in the cluster M is multiplied by two, and a constant (0–3) is added thereto to generate patterns labelled by 2M and 2M+1. The patterns 2M, 2M+1 are combined in a manner similar to the above to generate a complete dither pattern 11. An matrix defining the initial order of threshold values 0–7 in the complete dither pattern 11 is shown in FIG. 6A. The threshold values (1)–(7) are representations of halftone, and are shown by dot form in FIGS. 7B–7I, described later.

It should be noted that FIGS. 6A–6I are represented without the screen angle for simplicity. FIGS. 6B–6I show in order dot patterns which are arranged in the order of threshold values indicated in FIG. 6A, where ● indicates an ON dot and ○ indicates an OFF dot. A reproduced image is questioned which contains an ununiform pattern of a low density which is easily seen as defective. In FIGS. 6B–6E showing patterns having on dots of low density, ununiformity in on-dot interval in FIG. 6D is conspicuous as defective. Like this ununiformity in off-dot interval in FIG. 6F is conspicuous in FIGS. 6F–6I showing patterns having off dots of low density.

Another order of the threshold values 0–7, rearranged (relocated) in view of the problem mentioned above, is shown in FIG. 7A. The application of the order indicated in FIG. 7A allows the on-dot intervals of patterns represented in FIGS. 7B–7E to be all uniformly generated, and allows the off-dot intervals in FIGS. 7F–7I to be all uniformly generated. With such correction, a more smooth reproduced image can be obtained. FIG. 8 represents the results of comparing the gradation associated with the patterns shown in FIGS. 6B–6I with the gradation associated with the patterns shown in FIGS. 7B–7I. A broken line 12 corresponds to the gradation resulting from the patterns of FIGS.

6B–6I, while a solid line 13 corresponds to the gradation resulting from the patterns of FIGS. 7B–7I. As can be seen from the solid line 13 in FIG. 8, the linearity of the gradation relative to the order of threshold values is lost in the case of the patterns of FIGS. 7B–7I. However, a degree of fluctuations in gradation as shown is not easily recognized in a lower halftone area. In addition, it is possible to make a correction by T(n(i', j')) mentioned above, if necessary, at a mapping stage from the order of threshold values to threshold values.

Thus, within the complete dither pattern shown in FIG. 5, the initial order of threshold values 0–7 is corrected to the order of threshold values shown in FIG. 7A to prevent a degraded image quality in a lower halftone area. Degradation of image quality can be prevented by arranging on-off dot intervals equally as shown in FIG. 7. The dither pattern shown in FIG. 3 is generated in this way.

By applying a similar extension of dither pattern to kernel clusters K in FIGS. 9A, 10A, complete dither patterns 11 having a screen angle of 0° and 45°, respectively, can be generated as shown in FIGS. 9B, 10B. In addition, by turning the dither pattern shown in FIG. 3 upside down, a dither pattern having a screen angle of 63.4° is generated. It should be noted however that the initial order of threshold values need be corrected using the pattern of FIG. 7A for the kernel clusters shown in FIGS. 9B, 10B, as well. By applying dither patterns having different screen angles to each color plane of a CMYK image, an output image having a high saturation and a stable image quality can be generated.

In this case, generally, a dither pattern having a screen angle of 24.6° is assigned to a Cyan plane; 63.4° to a Magenta plane; 0° to a Yellow plane; and 45° to a Black plane. It will be of course understood that any other combinations of dither patterns having different screen angles may be applied. For example, the dither patterns assigned to the Cyan and Magenta planes may be exchanged with each other, or those assigned to the Yellow and Black planes may also be exchanged with each other. Further, since a dither pattern having a screen angle of 45° has a characteristic of being inconspicuous, a favorable image quality is also achieved by assigning this dither pattern to all planes of a CMYK image such that the positions of fat dots are different from one plane to another.

Figures 11A, 11B, 12A, 12B, 12C, 13A, 13B, 13C:
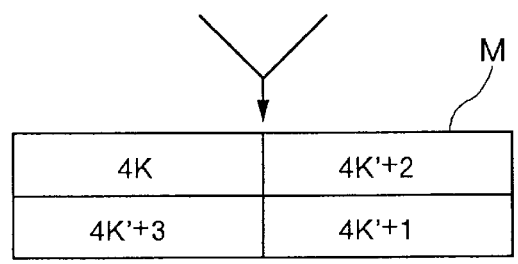
FIGS. 11A and 11B are pattern diagrams for explaining a raster device having a horizontal resolution four times higher than a vertical resolution according to the present invention.
FIGS. 12A–12C are pattern diagrams for explaining a raster device having a horizontal resolution four times higher than a vertical resolution according to the present invention.
FIGS. 13A–13C are pattern diagrams showing examples of other kernel clusters.

Another example will be shown below. For a binary output device having a resolution of 300 dpi in one direction and a resolution of 1200 dpi in the direction orthogonal to the one direction, kernel clusters as shown in FIGS. 11A, 11B are effective. In FIG. 11, assuming that a drawing held on a vertical plane is viewed, the horizontal direction corresponds to the direction of 1200 dpi, and the vertical direction to 300 dpi. However, while the kernel clusters of FIGS. 11A, 11B each generate a dither pattern having a screen angle of 0° or 26.6°, designing an appropriate pattern having a screen angle of 45° suitable for the generated dither patterns becomes difficult. As the second best measures for this case, it is thought that a kernel cluster K shown in FIG. 12A and another kernel cluster K' symmetric thereto shown in FIG. 12B are utilized to form an intermediate clusters M shown in FIG. 12C, and then a complete dither pattern formed by 2M, 2M+1, similarly to that shown in FIG. 3, is used. However, since rearrangement of the initial order of threshold values is not so effective in this case, the pattern shown in FIG. 12C is assigned to a less prominent Yellow plane or a less frequent Black plane, while the patterns shown in FIGS. 11A, 11B are assigned to Magenta and Cyan planes. In this way, a smooth image can be generated.

The patterns shown in FIGS. 11A, 11B, 12C are also applicable to a raster device which has five halftone levels and a resolution of 300 dpi in the horizontal and vertical directions. In this case, four threshold values in the horizontal direction are treated as a set, and a number of threshold values exceeded by input values is corresponded to a halftone level of one device dot pixel. Of course, in a similar consideration, the patterns shown in FIGS. 11A, 11B, 12C are also applicable to a three-value raster device having a horizontal resolution of 600 dpi and a vertical resolution of 300 dpi.

It will be appreciated from the foregoing that the present invention is likewise effective for raster devices having an equivalent resolution equal to or less than 600 dpi. The equivalent resolution is defined by a positive square root Do of (horizontal resolution)×(vertical resolution)×(a number of halftone levels of 1 device dot−1).

It is of course possible to apply the present invention to a raster device having a higher resolution than the above. For example, a similar kernel cluster can be easily created for a raster device having a horizontal resolution of 1200 dpi and a vertical resolution of 600 dpi. Further, while it is also possible to provide a more number of halftone levels the more a large capacity memory is required.

Figures 14, 15A, 15B, 15C:
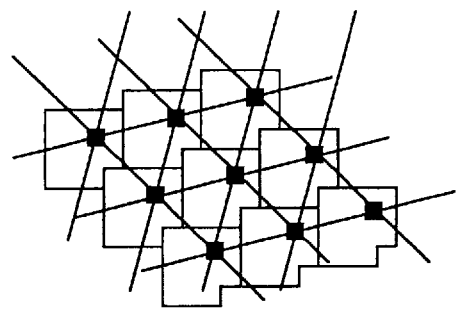
FIG. 14 is a diagram showing an arrangement of patterns according to the kernel cluster of FIG. 13.
FIGS. 15A–15C are pattern diagrams showing examples of kernel clusters suitable for a raster device having a resolution of 720×360 dpi according to the present invention.

FIGS. 13A–13C show other examples of kernel clusters. Assume that an output device has a horizontal resolution equal to a vertical resolution. From a kernel cluster shown in FIG. 13A, a dither pattern having a screen angle of 26.6° is formed, similarly to FIG. 3. From a kernel cluster shown in FIG. 13B, a dither pattern having a screen angle of 11.25° is formed. Of course, by turning the patterns upside down, dither patterns having screen angles of 63.4° and 78.75° are generated, respectively. Further, generated from a kernel cluster shown in FIG. 13C are fat dots which form a triangular lattice as illustrated in FIG. 14, unlike orthogonal dot matrices so far shown in the foregoing examples. In FIG. 14, dots filled with black correspond to a threshold value 0. In this case, since eyesore moire is more likely to occur depending upon a combination of other patterns, it is desirable to assign the same pattern with an appropriate shift to each color plane.

FIGS. 15A, 15B, 15C show examples of kernel clusters which may be applied to a raster device having a horizontal resolution twice as high as a vertical resolution. The examples shown in FIGS. 15A–15C are particularly effective if applied to a raster device having a horizontal resolution of 760 dpi and a horizontal resolution of 360 dpi. Nevertheless, with a raster device having a horizontal resolution of 760 dpi and a vertical resolution of 360 dpi, a screen line number is reduced to 114 lpi when using the examples shown in FIGS. 15A–15C. Thus, while the resolution is slightly sacrificed, the kernel clusters shown in FIGS. 15A–15C are effective.

According to the present invention as described above, a single dither pattern can be applied to each color plane to generate a high resolution image output. Particularly, the present invention is most effective to raster devices having an equivalent resolution of approximately 600 dpi, and can reduce the buffer memory capacity so that high definition images having a screen line number of 120 lpi and represented by 120 or more of halftone levels can be realized at a low cost.

What is claimed is:

1. In a digital halftoning method for a raster device which sequentially compares each pixel in an input image with each element in a dither threshold matrix to output a binary or multi-level pixel matrix output image, a method of generating said dither threshold matrix corresponding to a final threshold pattern comprising the steps of:

(a) based on a basic small threshold pattern K, multiplying each element in said pattern K by four, adding constants to each product to generate threshold patterns represented by 4K, 4K+1, 4K+2, 4K+3, and combining said four patterns to generate a basic intermediate threshold pattern M; and (b) based on said generated basic intermediate threshold pattern M, multiplying each element of said pattern M by two and adding constants to each product to generate threshold patterns represented by 2M, 2M+1, and combining said two patterns to generate said final threshold pattern.

2. A digital halftoning method according to claim 1, further comprising the step of:

rearranging minimum or maximum threshold values in said small threshold patterns constituting said threshold pattern independently of said threshold pattern configuration such that patterns generated in an output dot rectangular pattern corresponding to a uniform input image are positioned at net points at regular intervals.

3. An image processing device for an image output apparatus comprising store means for storing a threshold matrix and compare means for comparing each pixel of an input image with said threshold matrix to output a binary or multi-level-pixel matrix output image, said image output apparatus providing an image output in which a positive square root Do of a product of a resolution of one side of said output matrix and a resolution of the other side of said matrix, which equals a value calculated by subtracting one from a number of halftone levels per pixel, does not exceed 600 dpi wherein said image output apparatus provides equal to or more than 120×(120/Do)×(120/Do) sets of fat dots represented by using a plurality of dots and said fat dots appear and increase their diameters with the increase of a halftone level, based on said input image.

4. An image processing device for an image output apparatus comprising store means for storing a threshold matrix, and compare means for comparing each pixel of an input image with said threshold matrix to output a binary or multi-level-pixel matrix output image, said image output apparatus providing an image output in which a positive square root Do of a produce of a resolution of one side of said output matrix and a resolution of the other side of said matrix, which equals a value calculated by subtracting one from a number of halftone levels per pixel, does not exceed 600 dpi, wherein said image output apparatus provides eight sets of fat dots represented by using a plurality of dots, and said fat dots appear and increase their diameters with the increase of a halftone level, based on said input image.

5. An image processing device for an image output apparatus comprising store means for storing a threshold matrix, and compare means for comparing each pixel of an input image with said threshold matrix to output a binary or multi-pixel matrix output image, said image output apparatus providing an image output in which a positive square root Do of a product of a resolution of one side of said output matrix and a resolution of the other side of said matrix, which equals a value calculated by subtracting one from a number of halftone levels per pixel, does not exceed 600 dpi, wherein said image output apparatus provides sets of fat dots represented by using a plurality of dots, based on said input image, the diameter of the fat dot increases with the increase of a halftone level, and a spacing between said fat dots is less than 0.21 mm.

* * * * *